United States Patent
Tegel

(10) Patent No.: US 6,758,320 B1
(45) Date of Patent: Jul. 6, 2004

(54) PALLET POSITIONING SYSTEM

(75) Inventor: Robert G. Tegel, Huntley, IL (US)

(73) Assignee: Mid-West Automation Systems, Inc., Buffalo Grove, IL (US)

( * ) Notice: Subject to any disclaimer, the term of this patent is extended or adjusted under 35 U.S.C. 154(b) by 0 days.

(21) Appl. No.: 10/234,460

(22) Filed: Sep. 4, 2002

Related U.S. Application Data

(60) Provisional application No. 60/368,938, filed on Mar. 29, 2002.

(51) Int. Cl.[7] ............................................. B65G 15/64
(52) U.S. Cl. ............................ 198/345.1; 198/465.1; 198/793; 198/867.14
(58) Field of Search .................... 198/345.1, 345.2, 198/345.3, 465.1, 793, 867.14

(56) References Cited

U.S. PATENT DOCUMENTS

| | | | | |
|---|---|---|---|---|
| 2,903,120 A | * | 9/1959 | Thomas | 198/345.3 |
| 3,476,231 A | * | 11/1969 | Bower | 198/345.2 |
| 3,666,076 A | | 5/1972 | Miller et al. | |
| 3,690,433 A | * | 9/1972 | Buldini | 198/345.3 |
| 3,858,707 A | * | 1/1975 | Block et al. | 104/166 |
| 3,934,701 A | | 1/1976 | Mooney et al. | |
| 4,027,759 A | * | 6/1977 | Van Deberg | 193/1 |
| 4,201,284 A | * | 5/1980 | Brems | 198/345.3 |
| 4,257,513 A | * | 3/1981 | Siarto | 198/345.3 |
| 4,356,904 A | * | 11/1982 | Siarto | 198/345.3 |
| 4,394,897 A | | 7/1983 | Brems | |
| 4,402,393 A | | 9/1983 | Kent | |
| 4,512,068 A | | 4/1985 | Piotrowski | |
| 4,674,620 A | | 6/1987 | Inoue | |
| 5,170,678 A | | 12/1992 | Wawrzyniak et al. | |
| 6,213,285 B1 | | 4/2001 | Smith | |
| 6,234,296 B1 | | 5/2001 | Amador et al. | |
| 6,409,438 B1 | | 6/2002 | Kohler | |

OTHER PUBLICATIONS

Advertisement from DT Mid–West for previous model of conveyor lacking in–phase, in–line feature for feeding pins/shot pins.

* cited by examiner

*Primary Examiner*—Richard Ridley
(74) *Attorney, Agent, or Firm*—Michael Best & Friedrich LLP

(57) ABSTRACT

A positioning system utilizes a shot pin to fix the position of a grooved pallet at stations in a production line. The pallet travels along the production line under the influence of advancing feed pins. When the pallet arrives at a station, the head of the shot pin is positively urged toward the groove in the pallet until the head locks the pallet in the desired position. Simultaneously, the feed pin disengages from the pallet. When work is completed at the manufacturing station, the head of the shot pin moves away from and releases the pallet. Simultaneously, the feed pin engages the pallet. The feed pins and the shot pin operate in tandem, by moving in-phase along parallel lines in the same direction to accomplish their individual functions. The feed pins and the shot pin can operate relatively quickly without applying unnecessary torque to the conveyor or the pallet.

15 Claims, 5 Drawing Sheets

PALLET POSITIONING SYSTEM

This application claims the benefit of Provisional Application No. 60/368,938, filed Mar. 29, 2002.

TECHNICAL FIELD OF THE INVENTION

The invention relates to positioning devices used to reproducibly fix the position of pallets along a conveyor, indexer or other transport device so that work can be performed on a product located on the pallet. As used herein, the term "conveyor" is used to refer to any of the various mechanisms used to transport products located on pallets for product assembly or similar purposes.

BACKGROUND OF THE INVENTION

In order to keep pace with modern manufacturing methods, manufacturing line conveyors must move quickly and position the work accurately. Previously used positioning systems carried the work forward on pallets, and used feed pins to push or otherwise advance the pallets in the direction of conveyor travel (referred to as "x-direction") and horizontally perpendicular to the direction of conveyor travel (referred to as "y-direction"). In some cases, the previously used systems used positioning pins, often termed "shot pins", to fix the position of the pallets in all three spatial directions (including the direction vertically perpendicular to the direction of conveyor travel, or "z-direction") to achieve accurate positioning at particular points along the manufacturing line.

However, the previously used systems typically relied on feed pins and shot pins which were oriented obliquely or transversely to each other. The obliquely or transversely oriented pins are difficult to sequence precisely properly. They also give rise to complicated time-variant, three-dimensional loads which cause unnecessary vibration. Additionally, the previously used two- and three-directional pin positioning systems are complicated to construct and maintain. The trend in manufacturing is toward ever faster operating speeds.

A need exists for an improved system for fixing the position of pallets for conveyors, indexers and other manufacturing line transport systems. Preferably, the improved system is simpler and faster in operation, is easier to adjust and generates less onerous vibration than previously used systems. More preferably, the improved system needs only one fixing pin to accurately fix the position of a pallet bearing the work when the pallet arrives at a manufacturing station.

SUMMARY OF THE INVENTION

The invention provides a system which utilizes a single pin with a special head, called a "shot pin," to fix the position of a grooved work pallet at each manufacturing station in a manufacturing line. The shot pin and a feed pin for advancing the pallet move simultaneously along parallel lines in the same direction to accomplish their individual functions. The shot pin fixes the position of the pallet at the work station in the x-direction, the y-direction and the z-direction. Because the feed pins and the shot pin move in tandem, they can operate relatively quickly without applying unnecessary torque to the conveyor or the pallet.

When the pallet arrives at a manufacturing station, the head of the shot pin moves toward the groove in the pallet until the head locks the pallet in the desired position. At the same time, the feed pin moves along a parallel line in the same direction to disengage the pallet. When work is completed at the manufacturing station, the head of the shot pin moves away from and releases the pallet. Simultaneously, the feed pin moves to engage and take control of the pallet. The feed pin then moves to advance the pallet along the manufacturing line.

A datum bar registers the pallet in relation to one or more registration surfaces, such as a top surface and a side surface. These registration surfaces cooperate with corresponding registration surfaces of the pallet, such as a bottom surface and a side surface, to guide the pallet as it travels along the manufacturing line under the influence of advancing feed pins.

Preferably, the feed pin and the shot pin move simultaneously along parallel lines in the same general direction. This desirable relationship between the feed pins and the shot pin is referred to as operating "in tandem" or "in-phase." Tandem movement permits the shot pin to fix the pallet at the same time that the feed pin releases the pallet. Tandem movement also permits the shot pin to release the pallet at the same time that the feed pin engages the pallet. Adjusting the sequence and timing of tandem movement is relatively easy. Also, the vibration generated by tandem movement is typically less complicated and easier to dampen or otherwise deal with than the vibrations generated by obliquely or transversely oriented pins.

The shot pin is one component of a shot pin assembly, which additionally includes a bushing, a spring and a retaining washer. The shot pin has a shaft that is of circular cross section or, alternatively, of elliptical or polygonal cross section. The head of the shot pin is preferably shaped as the frustum of a truncated cone or the frustum of a truncated pyramid, more preferably as the frustum of a truncated sphere including, but not limited to a hemispheroid. The shaft passes through the bushing and the head mates with the groove to register and correctly position the pallet when the head is urged into the groove. The groove communicates with a depression or hollow in the pallet and is shaped to receive the shaft and head so as to accomplish this purpose.

When assembled, the bushing is preferably located in a hole in the datum bar. The internal and external clearances of the bushing in each direction are controlled to provide the degree of accuracy and precision in locating the pallet along with conveyor as required by the manufacturing station.

Because the shot pin positions and fixes the pallet simultaneously in the x-direction, the y-direction and the z-direction, the fixing process is simple and fast. A single motion quickly fixes or releases the shot pin relative to the pallet. By fixing the position of the pallet quickly and employing feed pins which operate in tandem with the shot pin, it is possible to begin work sooner on the product carried by the pallet and accomplish more work within a given time period.

DETAILED DESCRIPTION OF PREFERRED ASPECTS OF THE INVENTION

Figure 1:
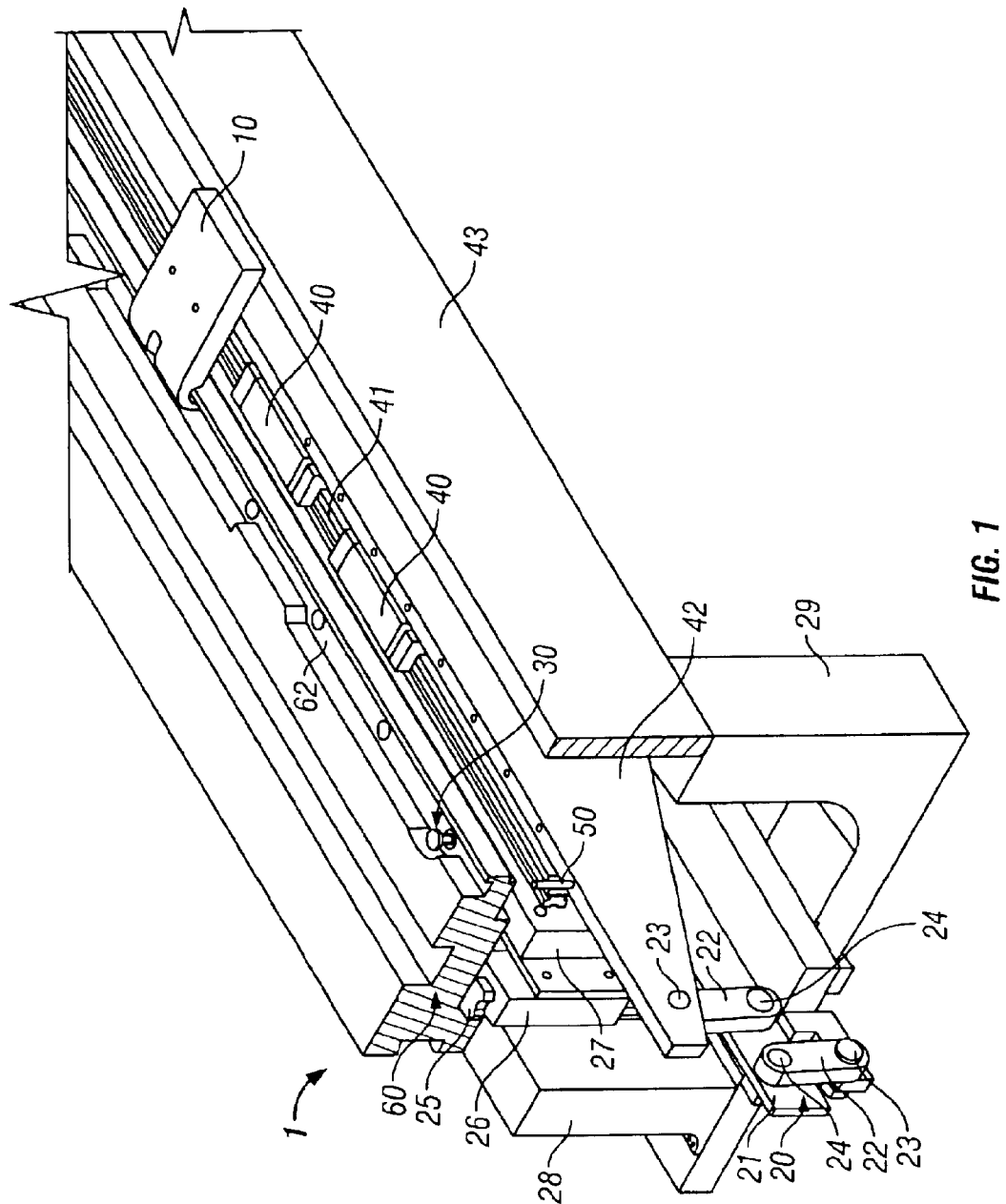
FIG. 1 is a cutaway perspective view of a manufacturing line conveyor having a pallet fixing and positioning system of the present invention.
Figure 5:
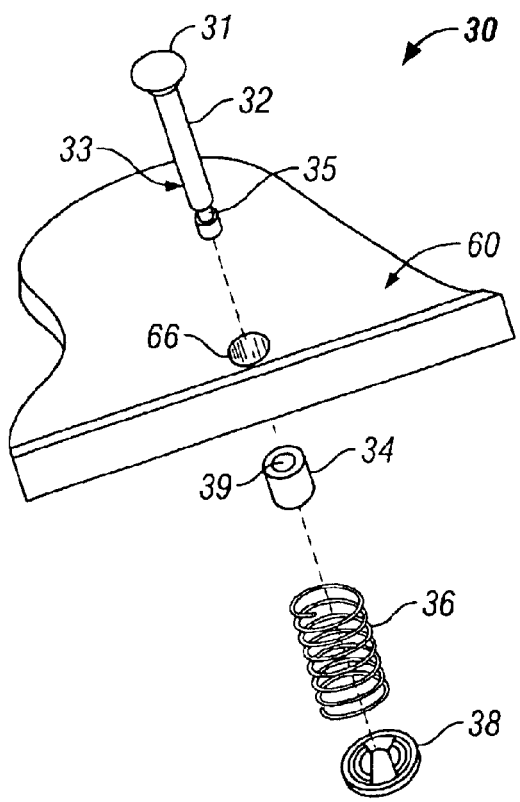
FIG. 5 is an exploded perspective view of shot pin assembly 30, and a portion of datum bar 60 that includes hole 66.

In a preferred embodiment, the invention is an improved system for positioning and fixing the position of a pallet for the manufacturing line conveyor 1, as depicted in FIG. 1. Each pallet 10 is fixed relative to one or more workstations adjoining the conveyor in the x-direction, the y-direction and the z-direction by use of one shot pin assembly 30. Shot pin 33 moves in the z-direction only. Indexing or feed pins 50 move at the same time and in the same direction as compared to shot pin 33, and along lines of movement that are parallel to the line of shot pin 33 movement. As feed pins 50 engage pallet 10, shot pin 33 releases the pallet, and vice-versa. Shot pin assembly 30, which is described below, is best seen in FIG. 5.

Pallet 10 is supported by datum bar 60 and indexed in the x-direction by feed pins 50. For the sake of clarity, only one shot pin assembly 30 and one feed pin 50 are shown in FIG. 1 although others are typically present. Once pallet 10 is advanced by the feed pin to a desired, predetermined position in the x-direction alongside shot pin 33, shot pin 33 moves downwardly in the z-direction into groove 12 in pallet 10. Nearly simultaneously, feed pin 50 is withdrawn downwardly, also in the z-direction. With shot pin 33 inserted in groove 12, as depicted in FIG. 1, pallet 10 is held in place by the resilience of spring 36 bearing against datum bar 60. Toggle assembly 20 actuates feed pins 50 and shot pins 33.

Figure 2:
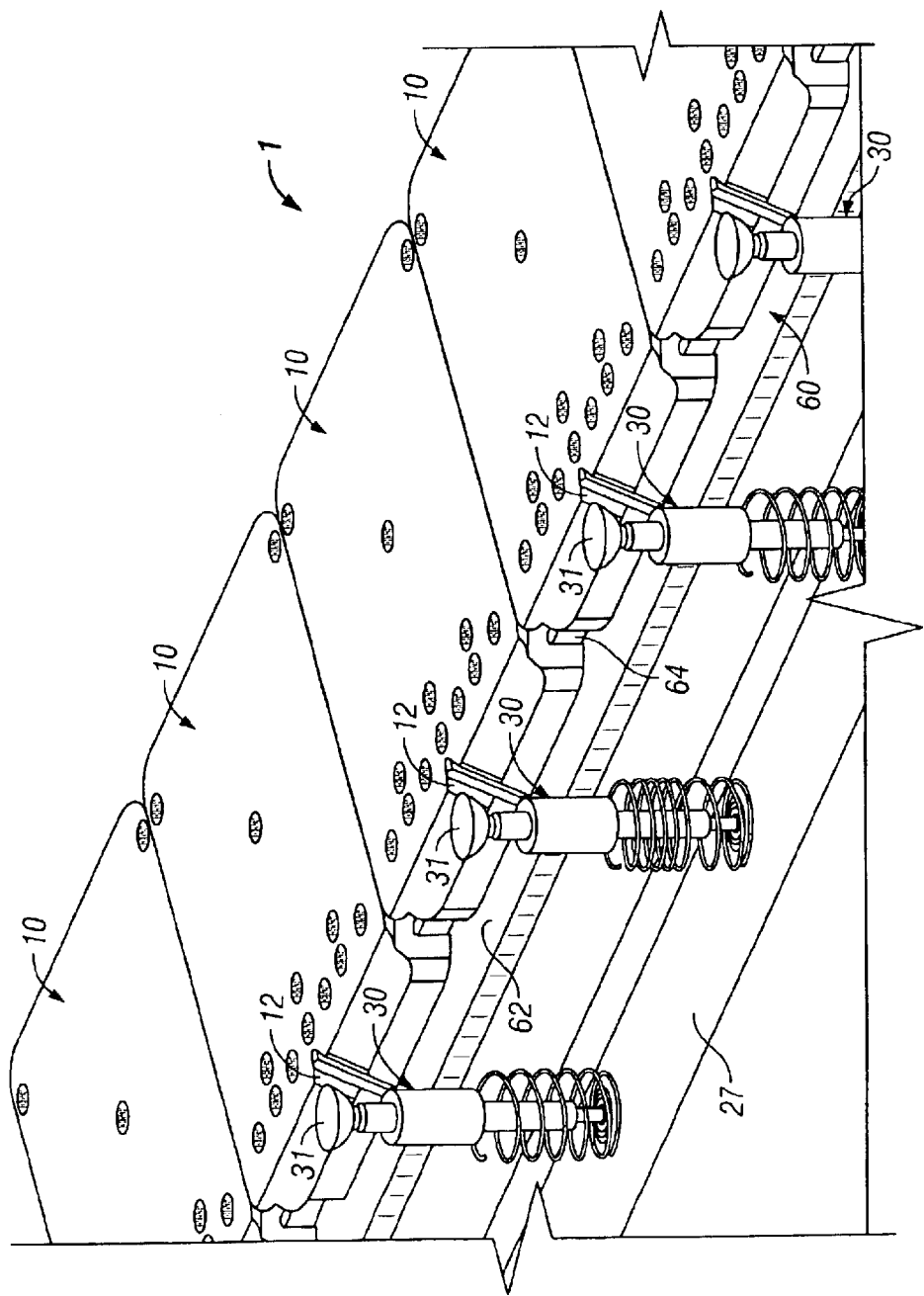
FIG. 2 is a perspective view of the manufacturing line conveyor depicted in FIG. 1, showing heads 31 of shot pin assemblies 30 in a releasing position for permitting pallets 10 to travel.

FIG. 2 shows shot pins 33 in a releasing position, with shot pin heads 31 raised above grooves 12 of pallets 10. As heads 31 are raised, feed pins 50 are inserted from below into receiving holes 13 (best seen in FIG. 4) defined by pallet 10. As long as shot pins 33 are in the releasing position, pallets 10 are free to travel in the x-direction under the influence of feed pins 50.

Figure 3:
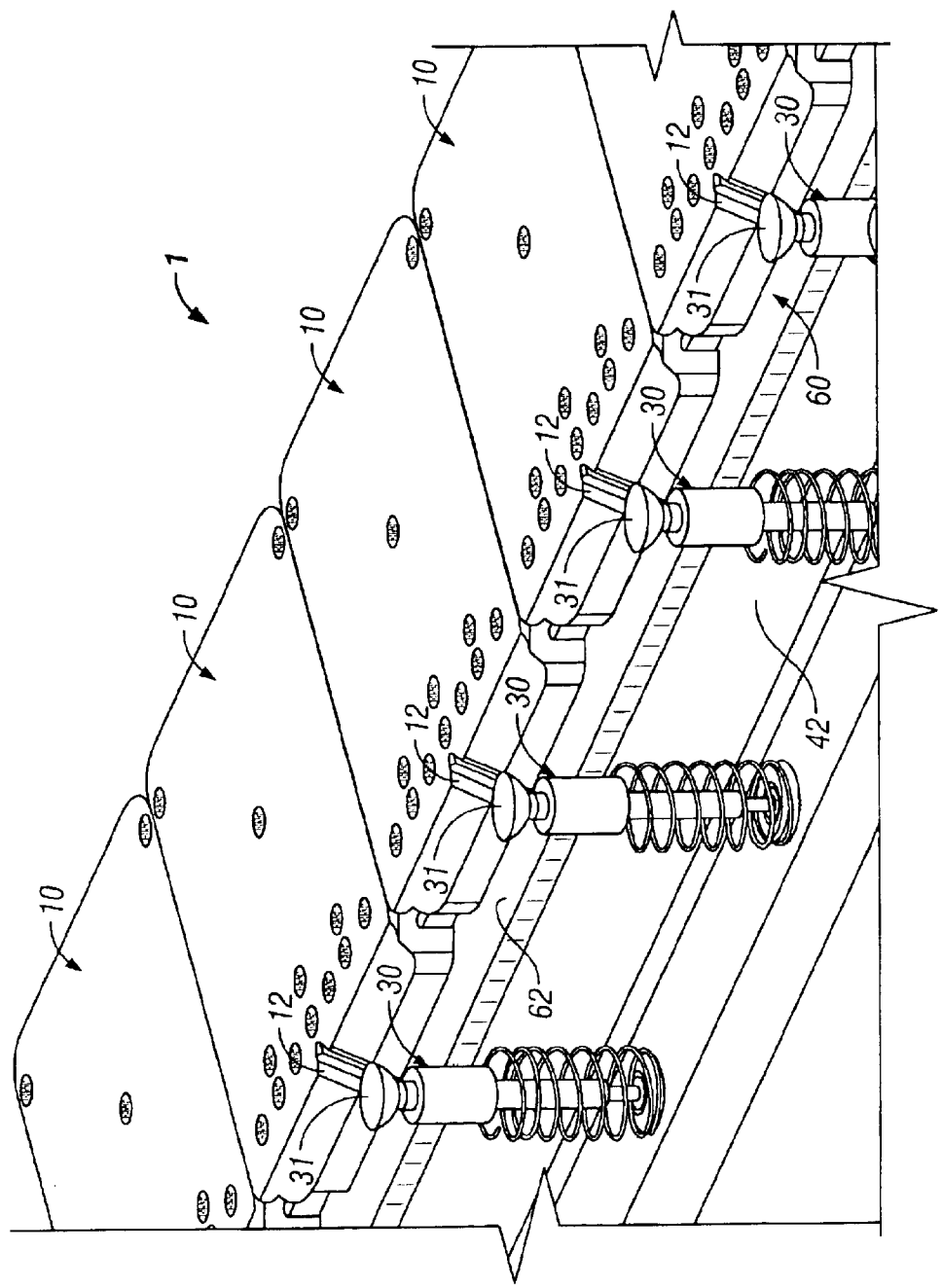
FIG. 3 is a perspective view of the manufacturing line conveyor depicted in FIG. 1 showing heads 31 of shot pin assemblies 30 in an fixing position for registering and fixing pallets 10 at manufacturing stations.

FIG. 3 shows a fixing position, in which shot pins 33 are fixed in grooves 12 of pallets 10. As soon as a particular shot pin head 31 is fixed in groove 12 of a particular pallet 10, work can immediately begin on that pallet. With the invention, work can be performed at a rate of 60 pallets per minute, but the invention is not limited to this work rate.

Figure 4:
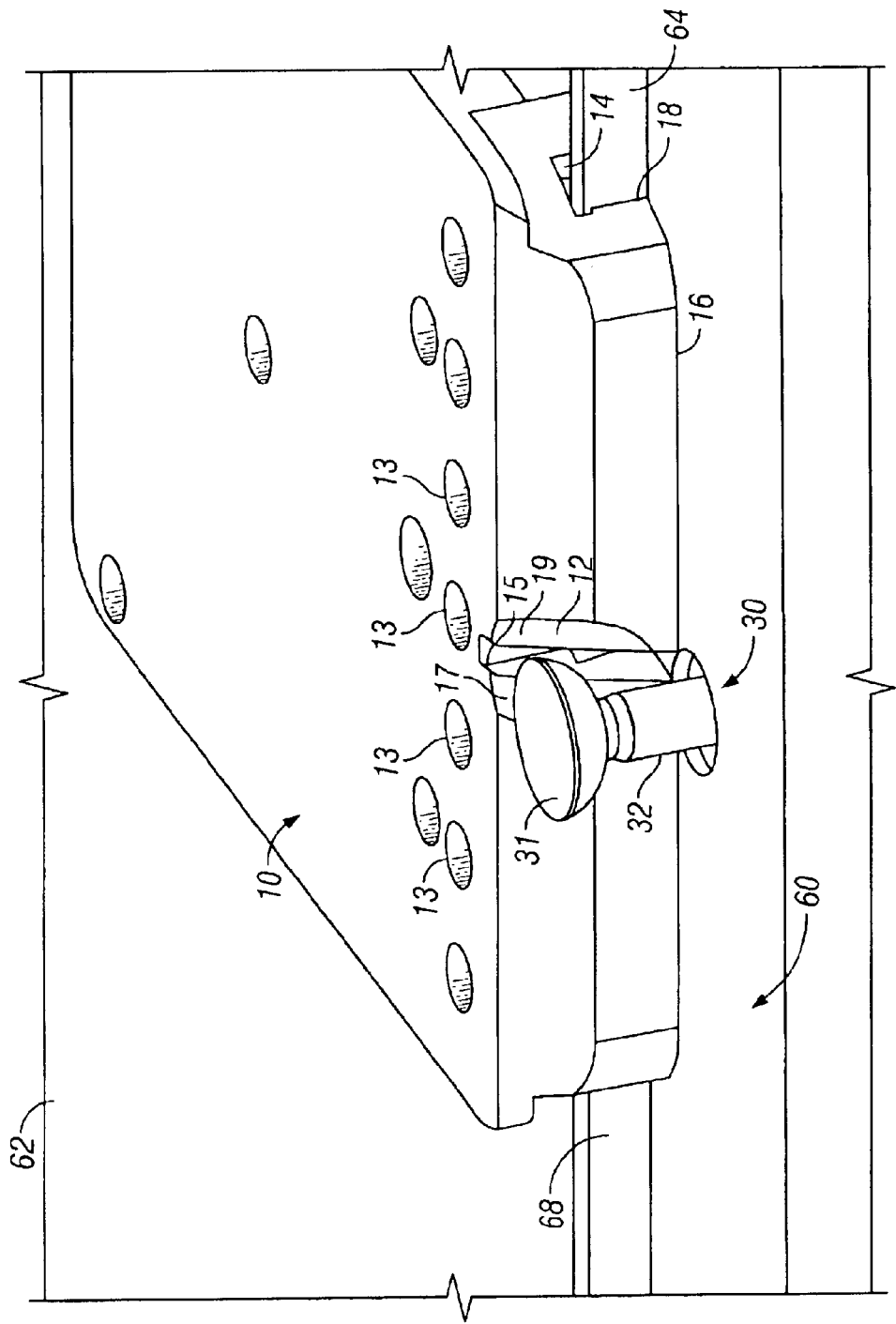
FIG. 4 is close-up perspective view of the manufacturing line conveyor depicted in FIG. 1, showing heads 31 of shot pin assembly 30 in releasing position for permitting pallets 10 to travel.

Referring now to FIG. 4, the cooperating shapes of groove 12 and shot pin 33, and the force exerted by spring 36, displace pallet 10 in the x-direction and the y-direction to the extent necessary to achieve proper registration and positioning along the carrier for purposes of performing work on an article (not shown) carried by the pallet. At the same time, the shot pin ensures that pallet 10 is securely held in the z-direction against top registration surface 62.

Datum bar 60 provides static surfaces for registering pallet 10 in the y- and z-directions. Top registration surface 62 of datum bar 60 supports bottom registration surface 16 of pallet 10, as pallet 10 moves from one workstation to another. Channel 14 is defined by pallet 10 and extends longitudinally in the x-direction. Side registration surface 18 of channel 14 is a vertically oriented wall partially defining channel 14 that registers with side surface 64 of ridge 68 of datum bar 60.

The pallet 10 is guided along the conveyor in the x-direction, and the pallet's movement is limited in the y-direction, by ridge 68 which extends longitudinally through channel 14. However, the invention can be practiced with datum bars of various shapes or configurations. For example, the datum bar may be adapted to operate with a side registration surface on the outside edge of a pallet, rather than wall 18 of channel 14 in pallet 10. As another example, a datum bar may include a valley, rather than the ridge 68, and that valley may receive a ridge in the pallet, rather than a channel (not shown). Additionally, this invention is not limited to any particular orientation of the pallet to any working plane. It is within the scope of the invention for the work plane of the pallet to be vertical, angular or rotated relative to the horizontal. For example, the pallet may be upside down within the working plane.

Head 31 of shot pin 33 and groove 12 of pallet 10 are best seen in FIG. 4. Preferably, head 31 is shaped as the frustum of a truncated sphere including, but not limited to, a hemispheroid. Alternatively, head 31 may be shaped as the frustum of a truncated pyramid or the frustum of a truncated cone, for example.

Groove 12 is an elongated hollow extending in a lengthwise direction that is oblique to the x-direction, the y-direction and the z-direction. Groove 12 includes a channel portion 15, slightly larger in diameter than shaft 32 of shot pin 33, and arcuately beveled surfaces 17 and 19 on opposite sides of channel portion 15. Preferably, groove 12 defines a cross-section corresponding to a cross-section of head 31. As an example, groove 12 is depicted in FIG. 4 as having a cross-section in the shape of a portion of a circle. This corresponds to the cross section of head 31, which is depicted as hemispheroidal in FIG. 4. Both of these cross sections are portions of a circle and have mating dimensions. As another example, if head 31 is shaped as the frustum of a right pyramid having a square base, it has a cross section in the shape of a portion of a square. In that case, groove 12 preferably has a cross section including a portion of a square. When shot pin 33 engages pallet 10, the cross sections of groove 12 and head 31 align to urge pallet 10 into a reproducible, pre-determined position with respect to shot pin 33 and, thereby, precisely fix the position of pallet 10 at, for example, a manufacturing station.

FIG. 5 depicts shot pin assembly 30 including shot pin 33, bushing 34, spring 36 and retaining washer 38. Shot pin 33 includes head 31, shaft 32 and retaining notch 35. Spring 36 is a compression or helical spring that tends to urge head 31 away from retaining washer 38, which is trapped in notch 35. Shot pin 33 drives pallet 10 into position in the x-direction and holds pallet 10 securely against top registration surface 62 in the z-direction.

Bushing 34 guides shot pin 33 so that shot pin 33 can move only in the z-direction. The interior 39 of bushing 34 has a cross-section corresponding in shape and sized to receive shaft 32. When assembled, bushing 34 is located within hole 66 defined by datum bar 60. The internal working clearance between shot pin 33 and bushing 34, and the external working clearance between bushing 34 and datum bar 60, may be fashioned within pre-determined ranges to control the amount of movement for pallet 10. That is, these clearances may be fashioned directionally within pre-determined ranges to provide more or less control of movement in each axis x and y independently. For instance, the clearances in the x-direction may be greater to provide compliance or freedom for pallet 10 in that axis only.

Returning to FIG. 1, toggle assembly 20 actuates feed pins 50 and shot pins 33 to operate in tandem. Toggle assembly 20 includes castings 28, 29 as stationary support members. Each of four link bars 22 (only two link bars 22 are shown in FIG. 1) are secured to actuating bar 21 by one of four central pivots 24, respectively (only two central pivots 24 are shown in FIG. 1). Two of link bars 22 are additionally secured to lift bar 27 by one of four outer pivots 23, and two of link bars 22 are additionally secured to castings 28, 29 by one of the four outer pivots 23 (only two outer pivots are shown in FIG. 1). Pallet support bar 43 provides support for pallet 10 as it moves along the path between work stations.

Lift bar 27 is secured to two carriage blocks 26 (only one carriage block 26 is shown in FIG. 1), which respectively are slidingly attached to one of two vertical rails 25 (only one carriage block 26 is shown in FIG. 1). Because vertical rails 25 are fastened to castings 28,29 and carriage blocks 26 are slidingly attached to vertical rails 25, lift bar 27 is constrained to move vertically.

When actuating bar 21 is reciprocated horizontally, lift bar 27 reciprocates vertically to move feed bar 42 up and down. Additionally, lift bar 27 strikes shot pin 33 and lifts it upwardly to produce the releasing stroke described above. When lift bar 27 descends, spring 36 urges shot pin 33 downwardly to produce the fixing stroke as described above.

Because feed pins 50 are mounted on feed bar 42, up and down movement of feed bar produces the engaging and disengaging strokes described above. As carriage blocks 40 reciprocate slidingly along horizontal rail 41, feed bar 42 moves horizontally to carry feed pins 50 through the advancing and recovery strokes described above.

Utilizing toggle assembly 20 as an actuator is not the only way to operate feed pins 50 and shot pins 33 in tandem. Apparatus other than toggle assembly 20 and motions other than those produced by toggle assembly 20 may be successfully employed in the invention. For example, independently controlled lead screws, pneumatic pistons or linear electric motors may be employed to actuate feed pins 50 or shot pins 33. Alternative motions which can be successfully employed include, but are not limited to, rectangular motion, elliptical motion and rotary motion. Programmable controllers and can, for example, be utilized to control the actuation and vary the motion of feed pins 50 or shot pins 33 in response to changing productions conditions, such as dimensional changes due to wear. However, toggle assembly 20 is presently preferred because it is relatively simple, reliable and easy to adjust.

Figure 6:
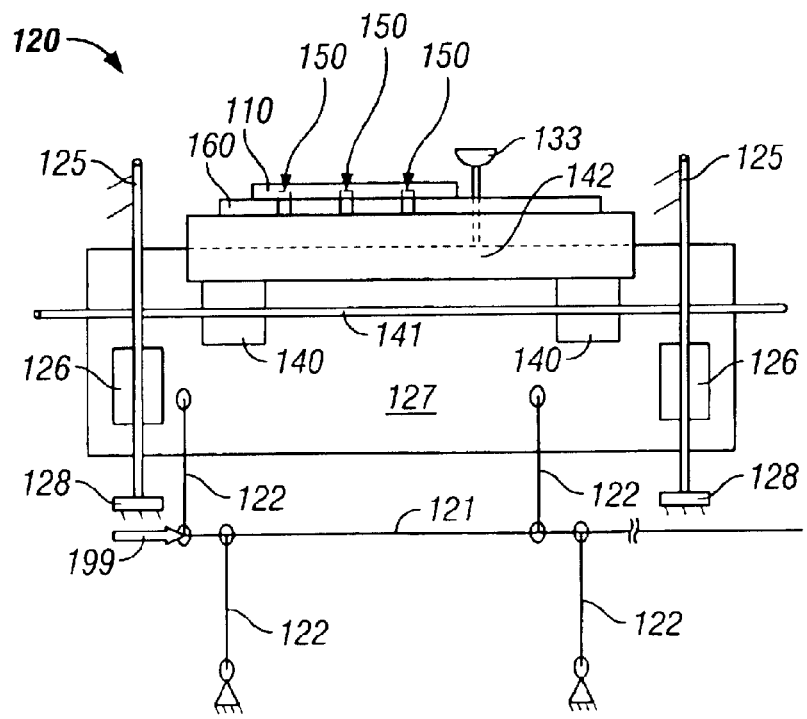
FIG. 6 is a schematic diagram of forces acting on a toggle mechanism.

FIG. 6 is a schematic diagram of toggle system 120. In FIG. 6, if an element is designated by a numeral ending in the same two digits as a numeral that appears in FIGS. 1 through 5, the FIG. 6 element corresponds to an element designated by the numeral that appears in FIGS. 1 through 5. For example, lift bar 127 depicted in FIG. 6 corresponds to lift bar 27 depicted in FIG. 1. As another example, feed bar 142 depicted in FIG. 6 corresponds to feed bar 42 depicted in FIG. 1.

FIG. 6 illustrates toggle system 120 as it appears as the engaging stroke is being completed. In order to keep link bars 122 from rotating downwardly under the influence of gravity, a horizontal force 199 is normally required on actuating bar 121 as shown in FIG. 6. As link bars 122 pivot to approach the vertical, the magnitude of horizontal force 150 required to keep link bars 122 from rotating downwardly approaches zero. In practice, link bars 122 typically operate in the range of about 65 degrees to about 5 degrees from the vertical.

Although the preferred embodiment set forth above has been described as being vertically and horizontally oriented, the invention is not limited to any particular spatial orientation. For example, the invention may be successfully practiced rotated or inverted with respect to manufacturing line 1, depicted in FIG. 1.

The invention uses only a single pin moving in the z-direction, rather than multiple pins moving in multiple directions, to fix the position of a pallet in the x, y and z-directions. This simplifies and accelerates the fixing process. More specifically, the cooperation of the shot pin, pallet channel and datum bar fix the position of the pallet in the y-direction. Additionally, the invention avoids any need for lift mechanisms, which are typically used by previously known systems to fix the position of pallets in the z-plane. Because the invention fixes the pallet in the same direction (i.e., the x-direction) as the pallet is already moving, and in phase with the operation of the feed pins transporting the pallet in the x-direction, the fixation process is simpler than if fixation were attempted using one or more pins moving in a direction perpendicular (e.g. y-direction or z-direction) to the travelling motion of the pallet. By fixing the position of the pallet more quickly, it is possible to begin work sooner on the product carried by the pallet and accomplish more work within a given time period.

While embodiments of the invention have been described above, those of ordinary skill in the art will recognize that these embodiments may be modified and altered without departing from the spirit and scope of the invention. The embodiments described above are to be considered in all respects as illustrative and not restrictive.

That which is claimed is:

1. A system for fixing a pallet at a desired location alone a predetermined path, which system comprises:

a datum bar that extends along a predetermined path;

a pallet for carrying a product, the pallet registering with the datum bar, said pallet including a groove of arcuate cross-section for receiving the shot pin, and at least a portion of the shot pin is shaped as the frustum of a truncated sphere;

a feed pin mounted for movement engaging the pallet and movement advancing the pallet alone the path, said engaging movement including an engaging stroke and a disengaging stroke, and wherein the feed pin moves during the engaging stroke in essentially opposite the direction in which the feed pin moves during the disengaging stoke, said advancing movement including an advancing stroke and a recovering stroke, and wherein the feed pin moves during the advancing stroke in essentially opposite the direction in which the feed pin moves during the recovering stroke; and a shot pin mounted for reciprocating movement generally parallel to the engaging movement to fix the pallet at a desired location along the path, said reciprocating movement including a fixing stroke and a releasing stroke, and wherein the shot pin moves during the fixing stroke in essentially opposite the direction in which the shot pin moves during the releasing stroke.

2. A system for fixing a pallet at a desired location along a predetermined path, which system comprises:

a datum bar that extends along a predetermined path;

a pallet for carrying a product, the pallet registering with the datum bar and having a groove of arcuate cross-section;

means for advancing the pallet along the path; and a shot pin which has a head and is mounted for reciprocating movement to fix the pallet at a desired location along the path, the shot pin movement including a fixing stroke during which the head moves toward the groove, and the head having a generally circular cross-section perpendicular to the fixing stroke.

3. The system of claim 2 in which the head is shaped as the frustum of a truncated sphere.

4. The system of claim 2 in which the groove is of arcuate cross-section perpendicular to the groove axis.

5. The system of claim 2 in which the shot pin includes a shaft surrounded by a bushing that is essentially fixed relative to the datum bar.

6. The system of claim 2 in which the groove axis is oblique to the path.

7. The system of claim 2 which comprises a feed pin for advancing the pallet along the path, the feed pin mounted for reciprocating engaging movement along an axis generally transverse to the path and for reciprocating advancing movement along an axis generally parallel to the path.

8. The system of claim 7 in which the engaging movement includes an engaging stroke and a disengaging stroke, and the advancing movement includes an advancing stroke and a recovering stroke.

9. The system of claim 8 in which the shot pin movement includes a releasing stroke, and the shot pin moves during the fixing stroke in a direction essentially opposite the direction in which the shot pin moves during the releasing stroke.

10. The system of claim 9 in which the fixing stroke is generally parallel to the disengaging stroke, and the releasing stroke is generally parallel to the engaging stroke.

11. The system of claim 9 in which the fixing stroke occurs essentially simultaneously with the disengaging stroke.

12. The system of claim 9 in which the releasing stroke occurs essentially simultaneously with the engaging stroke.

13. The system of claim 2 which also comprises a spring for urging the head toward the groove.

14. The system of claim 2 in which the groove is of generally elliptical cross-section perpendicular to the direction of the fixing stroke.

15. The system of claim 7 which comprises a toggle assembly for moving the feed pin and the shot pin.

* * * * *